(12) United States Patent
Rule et al.

(10) Patent No.: US 8,870,236 B2
(45) Date of Patent: Oct. 28, 2014

(54) PIPE SECTION JOINING

(75) Inventors: Joseph D. Rule, Cottage Grove, MN (US); Michael A. Kropp, Cottage Grove, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 91 days.

(21) Appl. No.: 13/504,532

(22) PCT Filed: Nov. 11, 2010

(86) PCT No.: PCT/US2010/056377
§ 371 (c)(1),
(2), (4) Date: Apr. 27, 2012

(87) PCT Pub. No.: WO2011/060167
PCT Pub. Date: May 19, 2011

(65) Prior Publication Data
US 2012/0211119 A1    Aug. 23, 2012

Related U.S. Application Data

(60) Provisional application No. 61/261,595, filed on Nov. 16, 2009.

(51) Int. Cl.
| | |
|---|---|
| F16L 25/00 | (2006.01) |
| F16L 21/00 | (2006.01) |
| F16B 1/00 | (2006.01) |
| F16L 47/20 | (2006.01) |
| F16B 3/00 | (2006.01) |
| F16L 21/03 | (2006.01) |

(52) U.S. Cl.
CPC .............. *F16L 21/00* (2013.01); *F16B 1/0014* (2013.01); *F16L 47/20* (2013.01); *F16B 3/00* (2013.01); *F16L 21/03* (2013.01)
USPC ........................... 285/381.4; 285/321; 29/447

(58) Field of Classification Search
USPC .......... 285/381.4, 381.5, 381.2, 381.3, 381.1, 285/321, 305, 382.4; 29/447
See application file for complete search history.

(56) References Cited

U.S. PATENT DOCUMENTS

| | | | | |
|---|---|---|---|---|
| 4,426,761 A | * | 1/1984 | Sassak | ............................ 29/447 |
| 4,436,858 A | | 3/1984 | Klosiewicz | |

(Continued)

FOREIGN PATENT DOCUMENTS

| | | |
|---|---|---|
| CN | 2596155 Y | 12/2003 |
| CN | 101126473 | 2/2008 |

(Continued)

OTHER PUBLICATIONS

PCT International Search Report from PCT/US2010/056377 dated Jul. 26, 2011, 4 pages.

(Continued)

*Primary Examiner* — David E Bochna
(74) *Attorney, Agent, or Firm* — Dena M. Ehrich (57) ABSTRACT

Methods of joining pipe section and joined pipe assemblies are described. The pipe sections, e.g., pipes and couplers, are joined by a mechanical interference bond formed using a shape memory polymer key. The key can be inserted into a first keyway of one pipe section, the pipes fitted to align first keyway with a second keyway of the second pipe section, and the shape memory polymer activated to at least partially fill both keyways.

23 Claims, 8 Drawing Sheets

(56) References Cited

U.S. PATENT DOCUMENTS

| | | | |
|---|---|---|---|
| 4,469,357 A | | 9/1984 | Martin |
| 4,650,228 A | * | 3/1987 | McMills et al. ........... 285/381.4 |
| 4,832,382 A | | 5/1989 | Kapgan |
| 4,872,713 A | | 10/1989 | Kapgan |
| 4,934,743 A | | 6/1990 | Kapgan et al. |
| 5,037,233 A | * | 8/1991 | Nishihara et al. ........... 285/381.2 |
| 5,145,935 A | | 9/1992 | Hayashi |
| 5,155,199 A | | 10/1992 | Hayashi |
| 5,506,300 A | | 4/1996 | Ward et al. |
| 5,665,822 A | | 9/1997 | Bitler et al. |
| 6,160,084 A | | 12/2000 | Langer |
| 6,370,757 B2 | * | 4/2002 | Lee et al. ........................ 29/447 |
| 6,388,043 B1 | | 5/2002 | Langer |
| 6,511,253 B1 | * | 1/2003 | Grimes et al. ................ 285/321 |
| 7,173,096 B2 | | 2/2007 | Mather et al. |
| 7,516,990 B2 | | 4/2009 | Jamison et al. |
| 8,220,841 B2 | * | 7/2012 | Hagen et al. .................. 285/321 |
| 2005/0244353 A1 | | 11/2005 | Lendlein et al. |
| 2006/0041089 A1 | | 2/2006 | Mather et al. |
| 2007/0009465 A1 | | 1/2007 | Lendlein et al. |
| 2007/0090641 A1 | | 4/2007 | Jamison et al. |
| 2008/0136180 A1 | | 6/2008 | Dittmar |

FOREIGN PATENT DOCUMENTS

| | | |
|---|---|---|
| EP | 0296003 | 12/1988 |
| GB | 650 573 | 2/1951 |
| JP | 60081572 | 5/1985 |
| JP | 2163594 | 6/1990 |
| JP | 2225518 | 9/1990 |
| JP | 2225900 | 9/1990 |
| JP | 3265784 | 11/1991 |
| JP | 4282093 | 10/1992 |
| JP | 05-133488 | 5/1993 |
| JP | 07126125 | 5/1995 |
| JP | 10-061857 | 3/1998 |
| JP | 2006242285 | 9/2006 |
| KR | 0166081 | 1/1999 |
| KR | 10-1999-0085577 | 12/1999 |
| KR | 10-2003-0066472 | 8/2003 |
| WO | WO 03/084489 | 10/2003 |

OTHER PUBLICATIONS

Gorden, "Applications of Shape Memory Polyurethanes," Proceedings of the First International Conference on Shape Memory and Superelastic Technologies, SMST International Committee, pp. 115-120, (1994).

Kim, et al., "Polyurethanes having shape memory effects", Polymer, vol. 37, No. 26, pp. 5781-5793 (1996).

Li, et al., "Crystallinity and Morphology of Segmented Polyurethanes with Different Soft-Segment Length", Journal of Applied Polymer Science, vol. 62, pp. 631-638, (1996).

Takahashi, et al., "Structure and Properties of Shape-Memory Polyurethane Block Copolymers," Journal of Applied Polymer Science, vol. 60 pp. 1061-1069, (1996).

Tobushi, et al., "Thermomechanical Properties of Shape Memory Polymers of Polyurethane Series and their Applications," Journal de Physique IV (Colloque C1), vol. 6, pp. 377-384 (1996).

Yakacki, et al., "Strong, Tailored, Biocompatible Shape-Memory Polymer Networks", Advanced Functional Materials, vol. 18, pp. 2428-2435 (2008).

D.L. Safranski et al., "Effect of chemical structure and crosslinking density on the thermo-mechanical properties and toughness of (meth)acrylate shape memory polymer networks", Polymer 49, pp. 4446-4455 (2008).

Hussein, et al., "New technologies for active disassembly: using the shape memory effect in engineering polymers", Int. J. Product Deveopment, vol. 6, Nos. 3/4, pp. 431-449 (2008).

\* cited by examiner

PIPE SECTION JOINING

CROSS REFERENCE TO RELATED APPLICATIONS

This application is a national stage filing under 35 U.S.C. 371 of PCT/US2010/056377, filed Nov. 11, 2010, which claims priority to U.S. Provisional Application No. 61/261,595, filed Nov. 16, 2009, the disclosures of which are incorporated by reference in their entirety herein.

FIELD

The present disclosure relates to methods for joining pipe sections and materials used to join pipe sections, particularly shape memory polymers.

SUMMARY

Briefly, in one aspect, the present disclosure provides a method of joining a first pipe section and a second pipe section. The first pipe section comprises a first keyway that is concave relative to the outer surface of the first pipe section, and the second pipe section comprising a second keyway that is concave relative to the inner surface of the second pipe section. The method comprises inserting the first pipe section into the second pipe section; aligning the first keyway and the second keyway; positioning a first key comprising a first shape memory polymer having a first transition temperature between the first keyway and the second keyway, wherein the key has a length and a cross section perpendicular to the length; heating the first key above the first transition temperature; and reducing the length and expanding the cross section of the first key such that the first shape memory polymer fills a portion of both the first keyway and the second keyway, forming a mechanical inference bond between the first pipe section and the second pipe section. In some embodiments, the method further comprises cooling the first shape memory polymer below the first transition temperature.

In some embodiments, the method further comprises inserting a third pipe section comprising a fourth keyway that is concave relative to the outside surface of the third pipe section into the second pipe section having a third keyway that is concave relative to the inner surface of the third pipe section; aligning the third keyway and the fourth keyway; positioning a second key comprising a second shape memory polymer having a second transition temperature between the third keyway and the fourth keyway; heating the second key above the second transition temperature; and reducing the length and expanding the cross section of the second key such that the second shape memory polymer substantially fills a portion of both the third keyway and the fourth keyway.

In some embodiments, the first key is recessed within the first keyway of the first pipe section before the first pipe section is inserted into the second pipe section. In some embodiments, the first key is recessed within the second keyway of the second pipe section before the first pipe section is inserted into the second pipe section.

In some embodiments, the first keyway comprises a first circumferential groove, the second keyway comprises a second circumferential groove, and the first key comprises an arc. In some embodiments, the first keyway comprises a plurality of first recesses, the second keyway comprises a plurality of second recesses, and the first key comprises a plurality of segments, each segment comprising a shape memory polymer. In some embodiments, the first or second keyway comprises a plurality of first recesses, the other keyway comprises a second recess, wherein aligning the first keyway and the second keyway comprises aligning two or more of the first recesses with at least a portion of the second recess to form a plurality of paired first and second recesses.

In some embodiments, the first key comprises a plurality of segments, each segment comprising a shape memory polymer. In some embodiments, positioning the first key between the first keyway and the second keyway comprises positioning at least one segment between two or more paired first and second recesses.

In some embodiments, the second pipe section further comprises a stop projecting from the inner surface of the second pipe section. In some embodiments, inserting the first pipe section into the second pipe section comprises inserting the first pipe section until the first pipe section contacts the stop.

In some embodiments, the method further comprises reheating the first key above the first transition temperature of the first shape memory polymer, repositioning the first pipe section relative to the second pipe section, and reforming the mechanical interference bond between the first pipe section and the second pipe section. In some embodiments, the method further comprises reheating the first key above the first transition temperature of the first shape memory polymer, and removing the first pipe section from the second pipe section.

In another aspect, the present disclosure provides a joined pipe assembly made according to any of the method of the present disclosure.

In yet another aspect, the present disclosure provides a joined pipe assembly comprising a first pipe section comprising a first keyway that is concave relative to the outside surface of the first pipe section; a second pipe section comprising a second keyway that is concave relative to the inside surface of the second pipe section; and a first key comprising a first shape memory polymer. At least a portion of the first pipe section is positioned inside the second pipe section such that the first keyway is aligned with the second keyway, and the first key is located between and at least partially fills the first keyway and the second keyway.

In some embodiments, the first key substantially fills a portion of both the first keyway and the second keyway corresponding to the length of the first key.

In some embodiments, the first keyway comprises a first circumferential groove, the second keyway comprises a second circumferential groove, and the first key comprises an arc. In some embodiments, at least one of the first and second keyways has an arcuate cross-section. In some embodiments, at least one of the first and second keyways has cross section selected from the group consisting of a triangle, a rectangle, and a trapezoid.

In some embodiments, the first keyway comprises a plurality of first recesses, the second keyway comprises a plurality of second recesses, and the first key comprises a plurality of segments, each segment comprising a shape memory polymer. The first keyway and the second keyway are aligned such that at least a portion of the first recesses are aligned with at least a portion of the second recesses to form a plurality of paired first and second recesses. The segments comprising the shape memory polymer are located between and at least partially fill the paired first and second recesses.

In some embodiments, the first or second keyway comprises a plurality of first recesses and the other keyway comprises a second recess. The first keyway and the second keyway are aligned such that two or more of the first recesses are aligned with the second recess to form a plurality of paired first and second recesses. The shape memory polymer is located between and at least partially fills at least some of the paired first and second recesses.

In some embodiments, the first or second keyway comprises a plurality of first recesses, the other keyway comprises a second recess, and the first key comprises a plurality of segments, each segment comprising a shape memory polymer. The first keyway and the second keyway are aligned such that two or more of the first recesses are aligned with second recess to form a plurality of paired first and second recesses. The segments comprising the shape memory polymer are located between and at least partially fill the paired first and second recesses.

In some embodiments, the first pipe section is in contact with a stop projecting from the inner surface of the second pipe section.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, pipe sections, e.g., pipes, pipe fittings, and pipe couplings, have been joined by a variety of means. In some cases the pipe sections are threaded and the pipes are mechanically coupled to one another by screwing one section to another. The use of threaded pipes results in reversible connections between pipe sections, i.e., the joint between pipe sections can be "broken" by simply unscrewing the sections, and the pipe sections can be simply rejoined.

Other, more permanent joining means include crimping and the use of soldering and adhesives to join pipe sections. While these approaches tend to provide greater flexibility in fitting the pipe sections together and produce a joint less susceptible to leaking, the joint between the pipe sections is not easily reversible. For example, when pipe sections are welded together, refitting or replacement generally requires cutting out a section around the joint, inserting a pipe section to span the removed portion, and re-welding the new pipe section. Similarly, adhesives generally cure to from a permanent bond and when rework is required joints formed from adhesive must be removed and whole pipe sections replaced.

In some embodiments, the present disclosure provides materials and methods that are useful for creating joints between pipe sections. Generally, the present disclosure relates to the use of shape memory polymers to join pipe sections. As used herein, the term "pipe" refers to any tubular article having any cross section including, but not limited to, right circular cylinders. As used herein, the term "pipe section" includes pipes, as well as fittings and couplings, e.g., elbows (e.g., a 45° or 90° elbow), T-connections, Y-connections, crosses, caps, reducers, expanders, and the like.

Shape memory materials, including shape memory polymers ("SMP") and shape memory metals or alloys ("SMA"), are a useful class of materials. Generally, a shape memory material is one that possesses an original, undeformed shape and that can be processed to have a reversibly-deformed shape. This deformed shape is semi-stable in that the shape memory polymer will retain the deformed shape so long as it is not activated. Depending on the material, the shape memory material can be can be activated by a variety of means including exposure to heat, light, and electromagnetism. Commonly, shape memory materials are activated by heating the material above a transition temperature, $T_{trans}$. Upon activation, the deformed shape is destabilized, and the shape memory polymer tends to return to its original, undeformed dimensions.

On the molecular level, SMPs are polymer networks comprising segment chains that are connected by netpoints. The netpoints can be formed by covalent bonds, entanglements of the polymer chains, or intermolecular interactions of certain polymer blocks or functional groups of the SMP. SMPs have a defined melting point ($T_m$) or glass transition temperature ($T_g$). Therefore, SMPs can be glassy or crystalline and can be either thermosets or thermoplastics. Hereinafter, the melting point ($T_m$) or glass transition temperature ($T_g$) will be referred to as the transition temperature or $T_{trans}$. SMPs have an advantage of capacity for high strain: often to several hundred percent.

In some cases, the physical netpoints of an SMP can be formed reversibly. These netpoints include intermolecular interactions and chain entanglements. SMPs with reversibly formable netpoints often have a temperature, $T_{perm}$, at which the netpoints are eliminated. $T_{perm}$ is higher than $T_{trans}$ and represents a temperature at which the polymer becomes capable of melt flow. SMPs with covalent bonds as netpoints are generally incapable of melt flow at any temperature, and generally do not have a $T_{perm}$.

The permanent shape of the SMP is established when the netpoints or crosslinks are formed in an initial casting or molding process. If the SMP is chemically crosslinked, these chemical crosslinks can be formed as the polymer is initially cured, often by including a multifunctional monomer in the polymerization mixture. Alternatively, the chemical crosslinks can be formed after the initial polymerization, for example by radiation such as UV light or E-beam. If the SMP is physically crosslinked and has a $T_{perm}$, the netpoints are usually formed by heating the polymer above the $T_{perm}$, forming the SMP into the desired permanent shape, and then allowing it to cool below $T_{perm}$, allowing the physical netpoints to form.

An SMP can be deformed from the permanent shape to a temporary, deformed shape. This step is often done by heating the polymer above its $T_{trans}$ and below its $T_{perm}$, if present; deforming the sample; and then holding the deformation in place while the SMP cools. Alternatively, in some instances the polymer can be deformed at a temperature below its $T_{trans}$ and maintain that temporary shape. Subsequently, the original shape is recovered by heating the material above the $T_{trans}$.

Examples of suitable physically crosslinked SMPs include, but are not limited to, linear block copolymers, such as thermoplastic polyurethane elastomers. Multiblock copolymers can also serve as SMPs, such as copolymers of polyurethanes, polystyrene and poly(1,4-butadiene), ABA triblock copolymers of poly(tetrahydrofuran) and poly(2-methyl-2-oxazoline), polyhedral oligomeric silsesquioxane (POSS)-modified polynorbornene, and PE/Nylon-6 grafted copolymer.

Additional examples of shape memory polymers include polyurethanes, polynorbornenes, polyethers, polyacrylates, polyamides, polysiloxanes, polyether amides, polyether esters, trans-polyisoprenes, polymethylmethacrylates, crosslinked polyethylenes, cross-linked polyisoprenes, crosslinked polycyclooctenes, inorganic-organic hybrid polymers, copolymer blends with polyethylene and styrene-butadiene co-polymers, urethane-butadiene co-polymers, PMMA, polycaprolactone or oligo caprolactone copolymers, PLLA or PL/D LA co-polymers, PLLA PGA co-polymers, and photocrosslinkable polymers including azo-dyes, zwitterionic, and other photochromatic materials such as those described in "Shape Memory Materials" by Otsuka and Wayman, Cambridge University Press 1998. Examples of suitable chemical crosslinked shape-memory polymers include, but are not limited to, HDPE, LDPE, copolymer of PE and polyvinyl acetate.

Additional suitable shape memory polymers include but are not limited to those described in WO 03/084489; U.S. Pat. No. 5,506,300 (Ward et al.), U.S. Pat. No. 5,145,935 (Hayashi), U.S. Pat. No. 5,665,822 (Bitler et al.), and Gorden, "Applications of Shape Memory Polyurethanes," Proceedings of the First International Conference on Shape Memory and Superelastic Technologies, SMST International Committee, pp. 115-19 (1994); U.S. Pat. No. 6,160,084 (Langer), U.S. Pat. No. 6,388,043 (Langer), Kim, et al., "Polyurethanes having shape memory effect," Polymer 37 (26):5781-93 (1996); Li et al., "Crystallinity and morphology of segmented polyurethanes with different soft-segment length," J Applied Polymer 62:631-38 (1996); Takahashi et al., "Structure and properties of shape-memory polyurethane block polymers," J. Applied Polymer Science 60:1061-69 (1996); Tobushi H., et al., "Thermomechanical properties of shape memory polymers of polyurethane series and their applications," J Physique IV (Colloque C1) 6:377-84 (1996)). Other SMPs are described in U.S. Pat. No. 5,155,199 (Hayashi), U.S. Pat. No. 7,173,096 (Mather et al.), U.S. Pat. No. 4,436,858 (Klosiewicz), JP 07126125, JP 2959775, U.S. 2005/244353 (Lendlein et al.), and U.S. 2007/009465 (Lendlein et al.).

Acrylic SMPs are disclosed in U.S. 2006/041089 (Mather et al.), C. M. Yakachi et al., in Advanced Functional Materials, 18 (2008), 2428-2435, and D. L. Safranski et al., in Polymer 49 (2008)4446-4455. The shape memory properties of acrylonitrile butadiene styrene (ABS) polymers, polycarbonate, and polyethylene terephthalate are disclosed by Hussein et al., in "New Technologies for Active Disassembly: Using the Shape Memory Effect in Engineering Polymers," Int. J. Product Development, 6:431-449 (2008).

Commercially available thermoplastic SMPs include, but are not limited to, polyurethanes available under the trade name "DiARY" including the MM type, MP type, MS type and MB (microbead powder) type series from SMP Technologies; elastic memory composite ("EMC") from Composite Technology Development, Inc.; and those available under the trade name "VERIFLEX" from Cornerstone Research Group ("CRG").

Shape memory polymers having a wide range of transition temperatures are known and are suitable for use in these applications. However, in some embodiments, there may be preferred ranges for the transition temperature. For example, in some embodiments, use temperatures may dictate the desired transition temperature of the shape memory polymer. For example, in some embodiments, $T_{trans}$ is at least 100° C., in some embodiments, at least 110° C., or even at least 120° C. In some embodiments, $T_{trans}$ is no greater than 180° C., in some embodiments, no greater than 160°, or even no greater than 150° C. In some embodiments, $T_{trans}$ is between 100 and 180° C., e.g., between 110 and 160° C., or even between 120 and 150° C.

Generally, the pipe joining methods of the present disclosure exploit the change in dimension that can be triggered by increasing the temperature of a shape memory polymer. In some embodiments, pipe sections can be dry fit together while the shape memory polymer is in its temporary deformed shape. Upon the change in dimensions that occurs when the shape memory polymer is heated above its transition temperature, the geometry of the shape memory polymer in its permanent, undeformed dimensions conforms to geometrical features of the pipe sections to form a mechanical interference bond between the pipe sections. Generally, the dimensions of the shape memory polymer and the geometrical features of the pipe sections are selected such that, absent reheating the shape memory polymer above its transition temperature, that the pipe sections can only be separated by shearing the shape memory polymer.

Figure 1:
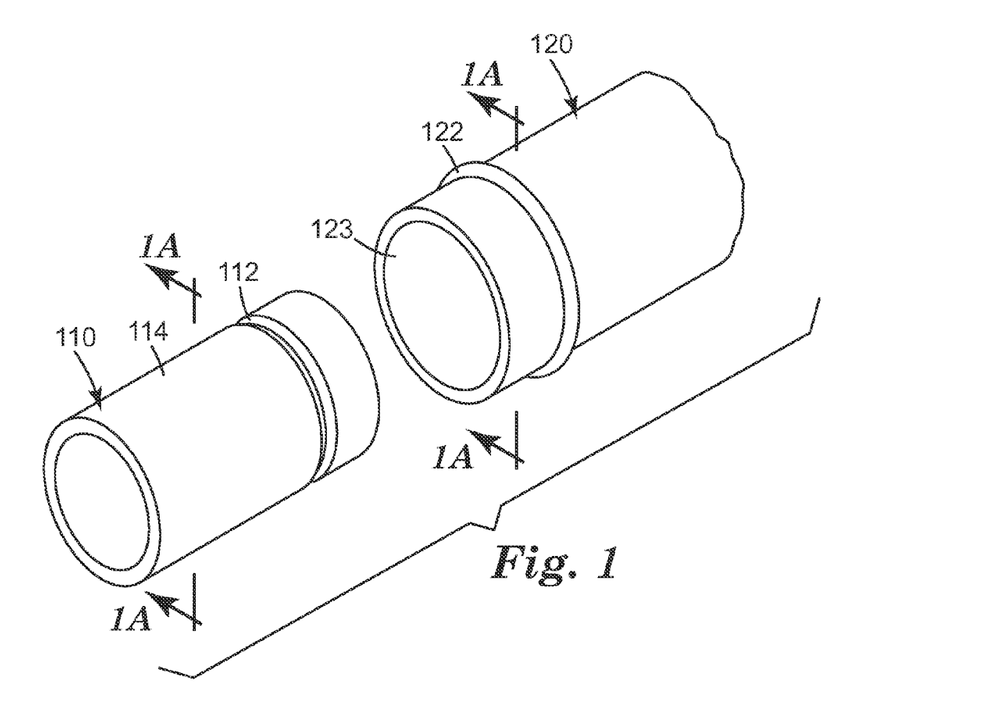
FIG. 1 illustrates first and second pipe sections having keyways, according to some embodiments of the present disclosure.
Figure 1A:
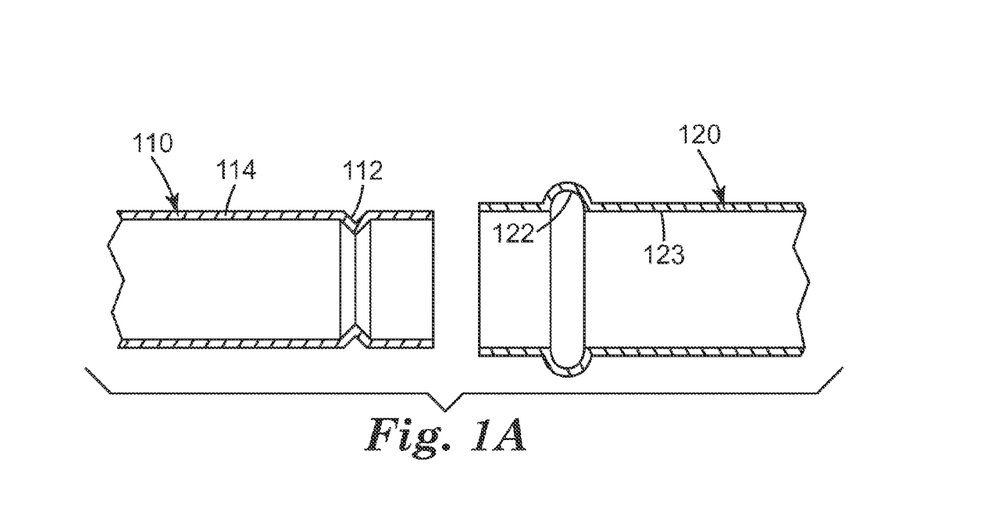
FIG. 1A is a cross-sectional view of the pipe sections of FIG. 1.
Figure 2:
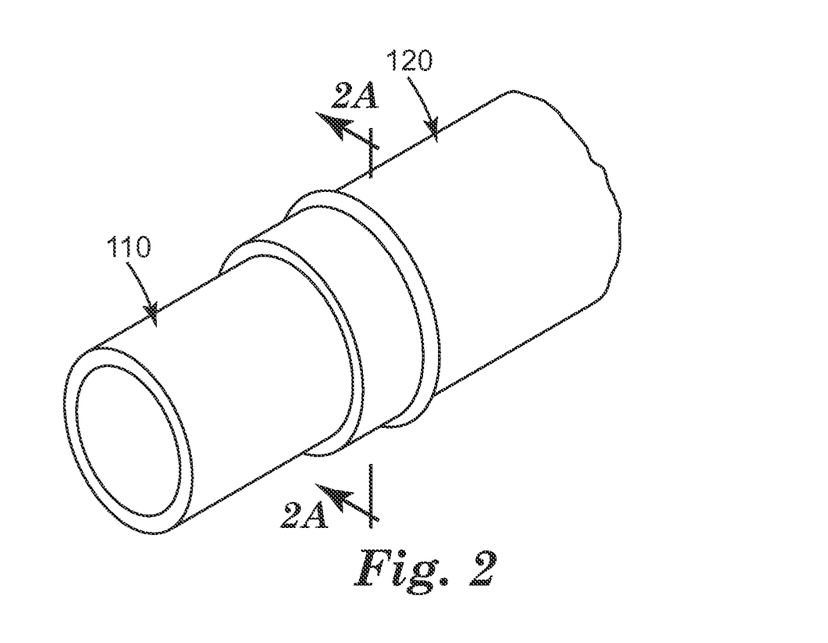
FIG. 2 illustrates the first pipe section of FIG. 1 inserted into the second pipe section of FIG. 1.
Figure 2A:
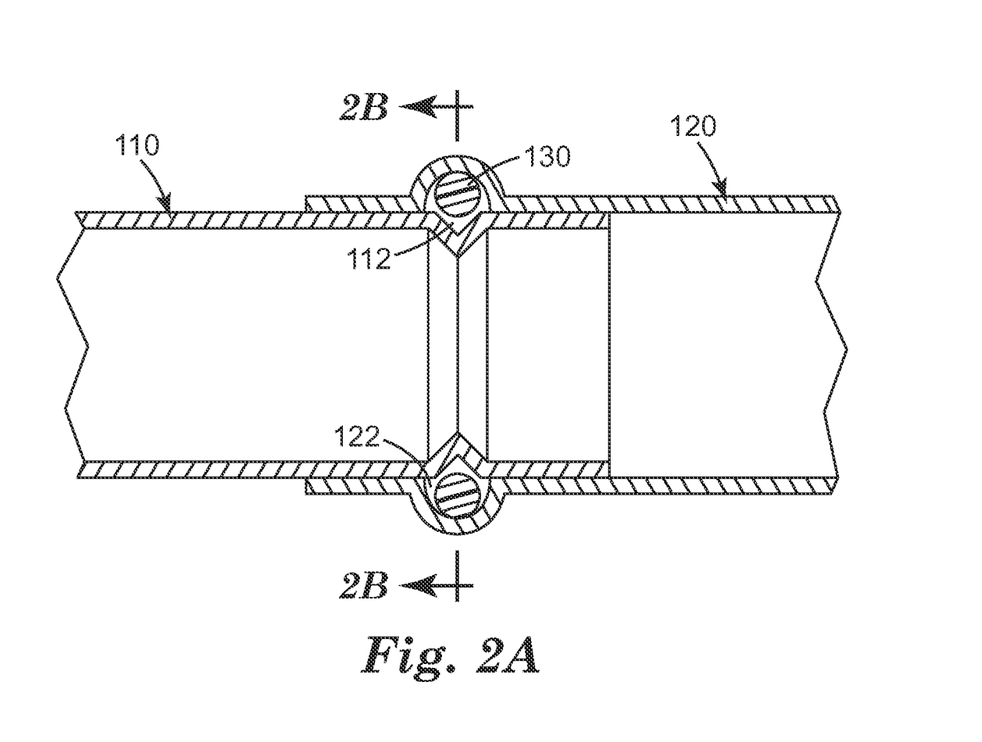
FIG. 2A is a cross-sectional view of the pipe sections of FIG. 2 including the alignment of the keyways and a key.
Figure 2B:
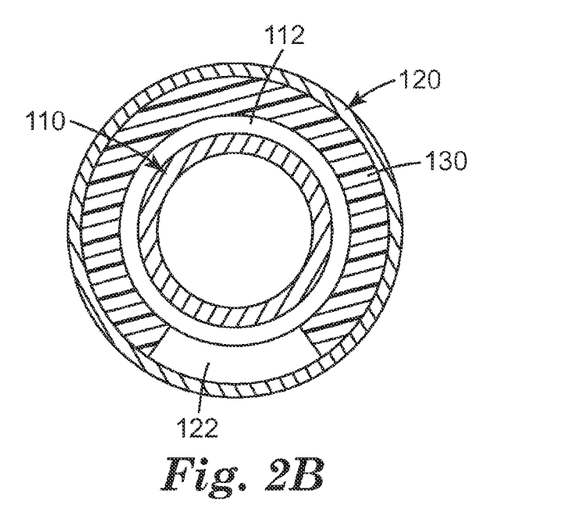
FIG. 2B is a cross-sectional view of the aligned keyways including the key.
Figure 3:
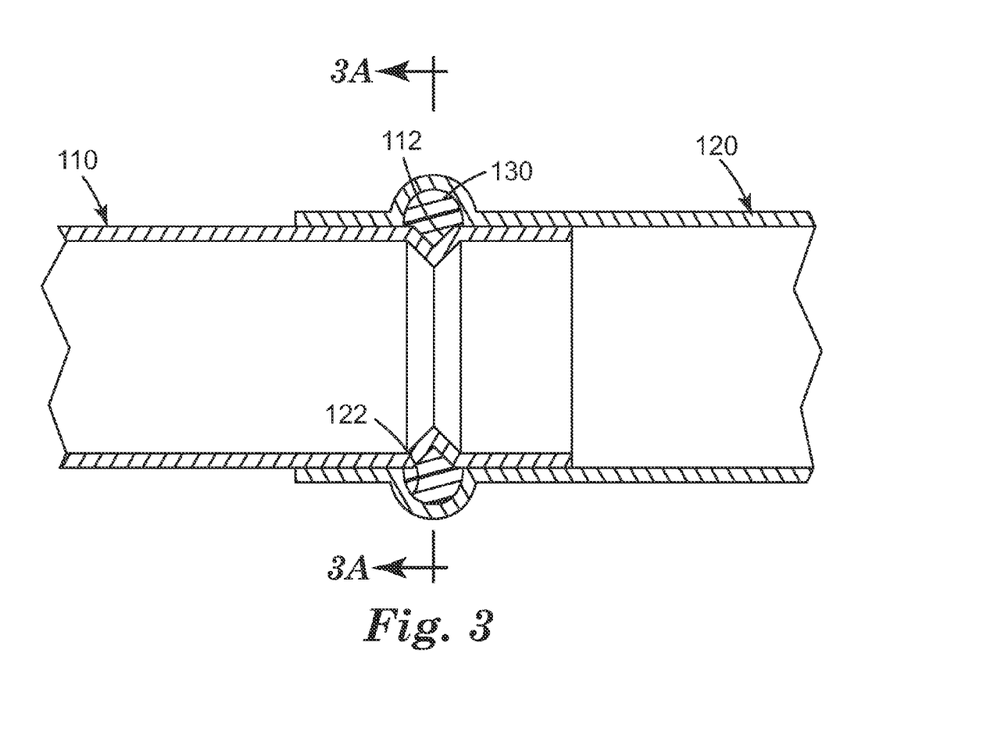
FIG. 3 is the cross-sectional view of FIG. 2A showing the change in dimensions of the key upon activation.
Figure 3A:
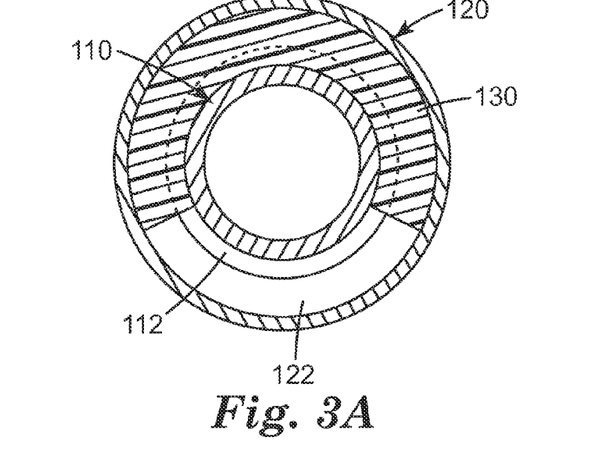
FIG. 3A is the cross-sectional view of FIG. 2B showing the change in dimensions of the key upon activation.

An exemplary embodiment of the joined pipe sections and methods of pipe joining according to the present disclosure are illustrated in FIGS. 1-3. Referring to FIGS. 3 and 3A, key 130 is used to join first pipe 110 to second pipe 120. Referring to FIGS. 1 and 1A, first pipe 110 includes first keyway 112, which is concave relative to outer surface 114 of first pipe 110. Provided that it is concave relative to outer surface 114, the cross-sectional shape of first keyway 112 is not particularly limited. For example, as shown in FIG. 1A, first keyway 112 has a substantially triangular cross section having its greatest width at outer surface 114 and tapering to its narrowest width as the keyway extends towards the center of first pipe 110.

Second pipe 120 includes second keyway 122, which is concave relative to inner surface 123 of second pipe 120. Provided that it is concave relative to inner surface 123, the cross-sectional shape of second keyway 122 is not particularly limited. For example, as shown in FIG. 1A, second keyway 122 has an arcuate cross section having its greatest width at inner surface 123 and tapering to its narrowest width as the keyway extends away from the center of second pipe 120.

Referring to FIGS. 2, 2A and 2B, first pipe 110 is inserted into second pipe 120 such that first keyway 112 and second keyway 122 are substantially aligned. Key 130, which comprises a shape memory polymer, is positioned in the cavity formed between first keyway 112 and second keyway 122. At this point, key 130 is in its temporary or reversibly-deformed shape and is completely recessed within second keyway 122.

Referring to FIGS. 3 and 3A, when activated by, e.g., heating the shape memory polymer above its transition temperature, key 130 tends to return to its permanent or undeformed shape. In this case, the cross sectional dimensions of key 130 expand and the length of the key decreases. The ability of the shape memory polymer to return to its undeformed shape will be constrained by the dimensions of the first and second keyways. Generally, upon activation, the key fills at least a portion of both the first keyway and the second keyway. In some embodiments, key 130 fills the depths of first keyway 112 and second keyway 122 over the reduced length of the key.

Because the shape memory fills at least a portion of both first keyway 112 and second keyway 122, when the shape memory polymer cools below the transition temperature, a mechanical interference joint bonding first pipe 110 to second pipe 120 is formed. In order to separate first pipe 110 from second pipe 120, key 130 would have to be sheared. The strength of the joint is thus affected by the geometry (e.g., cross sectional area and length perpendicular to the direction of shear) and physical properties (e.g., shear modulus and shear strength) of the key.

In some embodiments, the shape memory polymer may completely fill the depth of one or both of the first keyway and the second keyway. In some embodiments, the shape memory polymer "substantially fills" the depth of a keyway, e.g., when defects such as surface irregularities and entrapped air inhibit or prevent the shape memory polymer from completely filling the keyways. In some embodiments, the shape memory polymer may only partially fill the depth of one or both of the first keyway and the second keyway. Generally, the extent to which the shape memory polymer fills the first and second keyway depends on the shape and dimensions of the keyways and the shape and dimensions of the key, both before and after activation.

The shape memory polymer key may be activated, i.e., heated above its transition temperature using any of a variety of means. For example. A flame could be directed at the pipe, similar to welding operations. However, in some embodiments, it may be undesirable to use an open flame. Due to the relatively low transition temperatures of the shape memory polymers, in some embodiments, the key can be activated by directing a hot fluid, e.g., a hot gas at the pipe sections. For example, in some embodiments, a hot air gun could be used to heat the pipes, and in turn heat the shape memory polymer key above its transition temperature. Generally, the key will cool below its transition temperature when the heat source is removed. However, in some embodiments, it may be desirable to accelerate the cooling by apply a cold fluid, e.g., cool air or water, to the pipe sections.

Generally, pipes joined by an external sleeve made of shape memory polymer can be separated by deforming the shape memory polymer in a bending or twisting mode. In contrast, upon filling the aligned keyways, the key creates a mechanical interference bond between the pipes. Because the shape memory polymer fills both keyways, the pipes can only be separated by shearing the key and a significantly stronger joint is formed.

In addition to triangular-shaped and arcuate keyways, other keyway shapes may also be used. For example, in some embodiments, keyways having a rectangular cross-section may be used. In some embodiments, keyways having a trapezoidal cross-section may be used.

In some embodiments, a keyway may extend around the entire circumference of a pipe. However, the keyway may be of any length provided the key can be positioned within the keyway. For ease of inserting the key and aligning the first keyway and the second keyway, in some embodiments it may be preferable to have a keyway that extends around the entire circumference of at least one, and, in some embodiments, both, of the pipe sections being joined. In addition, once the keyways are aligned, the pipe sections can be rotated relative to each other during the dry fit stage. Then, when the pipe sections are oriented as desired, the shape memory polymer can be heated above its transition temperature, leading to cross sectional expansion of the key and the formation of a mechanical interference bond joining the two pipe sections.

Figure 4:
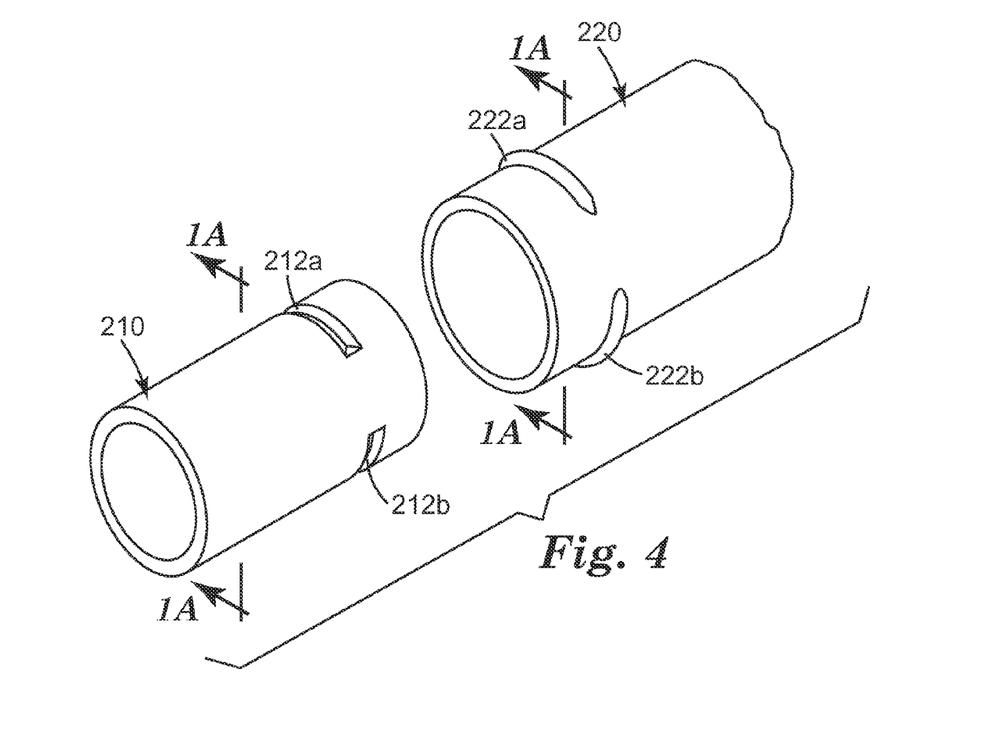
FIG. 4 illustrates first and second pipe sections having keyways comprising a plurality of recesses, according to some embodiments of the present disclosure.

In some embodiments, e.g., when twisting of the pipe sections may be undesirable, keyways comprising a plurality of recesses may be used with a key comprising a plurality of separate shape memory segments. For example, referring to FIGS. 4 and 5, first pipe 210 includes a keyway comprising a plurality of first recesses positioned around its circumference, including first recesses 212a, 212b, and 212c. Similarly, second pipe 220 includes a keyway comprising a corresponding plurality of second recesses including second recesses 222a, 222b, and 222c.

Figure 5:
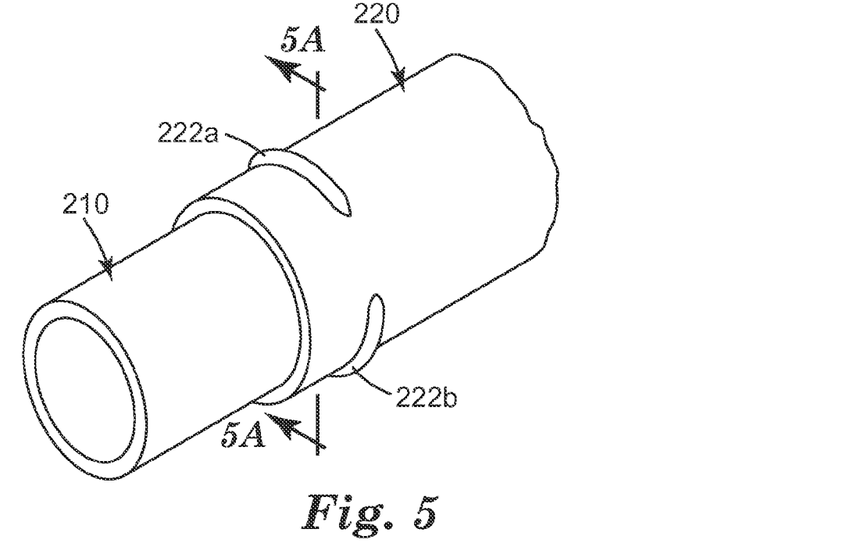
FIG. 5 illustrates the first pipe section of FIG. 4 inserted into the second pipe section of FIG. 4.
Figure 5A:
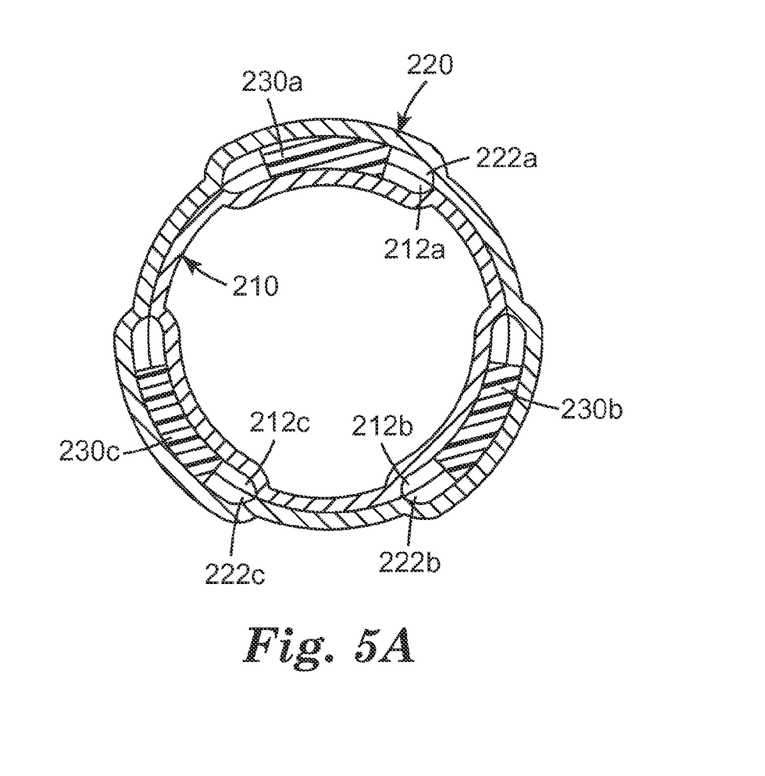
FIG. 5A is a cross-sectional view of the aligned keyways including a key comprising a plurality of segments after they has been activated.

Referring to FIGS. 5 and 5A, when first pipe 210 is inserted in second pipe 220, one first recess 212a is aligned with one second recess 222a, with segment 230a of shape memory polymer positioned between them. Similarly, segment 230b of shape memory polymer is positioned between second aligned pair of first recess 212b and second recess 222b, and segment 230c is positioned between third aligned pair of first recess 212c and second recess 222c. In some embodiments, a segment of shape memory polymer may not be present between each pair of aligned recesses.

Referring to FIG. 5A, when the shape memory polymer segments are activated (e.g., heated above their transition temperature) the segments of shape memory polymer will expand in cross section filling the aligned pairs of first and second recesses. When the shape memory polymer cools, the first pipe and the second pipe will be joined by the interference fit of the shape memory segments in the pairs of aligned recesses.

In some embodiments, a plurality of recesses forming a first keyway in a first pipe section may be aligned with a single common second keyway in a second pipe section. In some embodiments, a single key could be recessed within the second keyway. The first and second pipe section can then be aligned such that two or more of the recesses of the first keyway are aligned with the second keyway with the key positioned between the aligned recesses and second keyway. When the key is heated above its transition temperature, the key would expand to fill the two or more recesses of the first keyway and a corresponding portion of the second keyway forming an interference bond between the pipe sections. Alternatively, in some embodiments, a plurality of segments forming the key could be positioned within a plurality of recesses forming the first keyway. Then, when the segments are heated above their transition temperatures, the segments would expand to fill the two or more of the recesses of the first keyway and the corresponding regions of the second keyway forming an interference bond between the pipe sections.

Generally, the length of the key is selected to provide the desired mechanical interference bond strength. However, regardless of the length of key and the lengths of the keyways relative to the length of the key, the reduction in the length of the key when activated results in portions of the keyways that are not filled with the shape memory polymer. Thus, the key itself does not provide a fluid-tight pressure seal over the entire length of the keyways.

In some embodiments, one or more seals may be used in combination with the key. Because the seals do not necessarily need to contribute to the bond between the pipes, there is great flexibility in the selection, location, and materials of such seals. Any known seal may be used, including, e.g., O-rings.

Figure 6A:
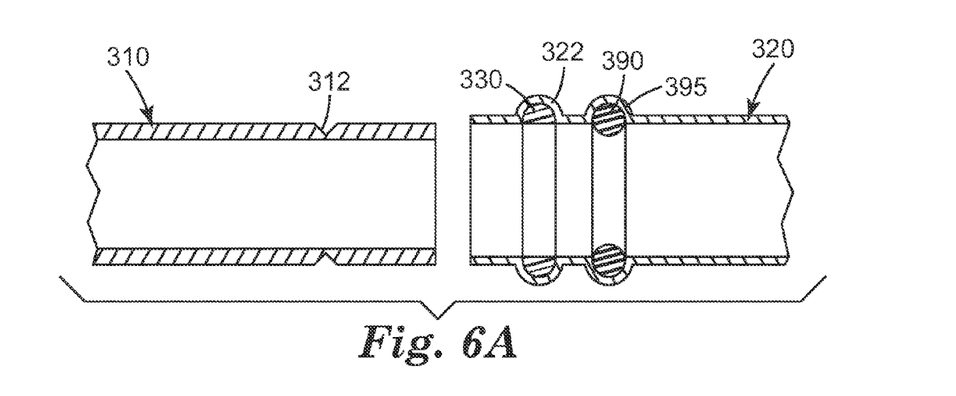
FIG. 6A illustrates a cross-section of first and second pipe sections having keyways and a seal, according to some embodiments of the present disclosure.
Figure 6B:
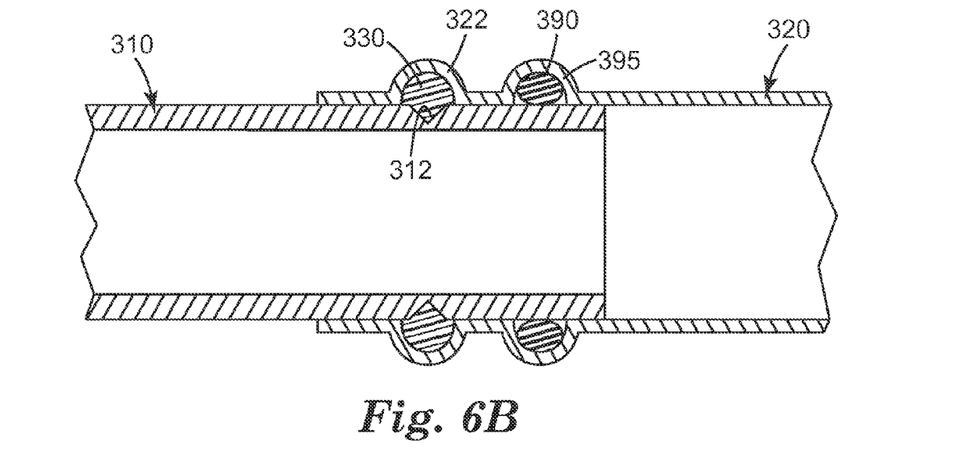
FIG. 6B illustrates a cross-section of the first pipe section of FIG. 6A inserted into the second pipe section of FIG. 6A, including a key and a seal.

For example, referring to FIGS. 6A and 6B, first pipe 310 is inserted into second pipe 320 such that first keyway 312 and second keyway 322 are substantially aligned. Key 330, comprising a shape memory polymer, is positioned in the cavity formed between first keyway 312 and second keyway 322. As shown, O-ring 390 is partially recessed into groove 395 of second pipe 320. When the pipe sections are joined, O-ring 390 is positioned between first pipe 310 and second pipe 320 forming a seal, e.g., a fluid tight seal. Generally, the O-ring is compressed against the smooth outer surface of the first pipe forming a fluid tight seal. In some embodiments, a plurality of O-rings or other seals may be used as needed to achieve the desired seal and prevent leaks.

Referring to FIG. 6B, when activated by, e.g., heating the shape memory polymer above its transition temperature, the length of key 330 decreases and the cross sectional dimensions of the key perpendicular to its length increases. Thus, key 330 provides a mechanical interference bond between the first pipe and the second pipe, while O-ring 390 independently provides the desired seal.

Figure 7:
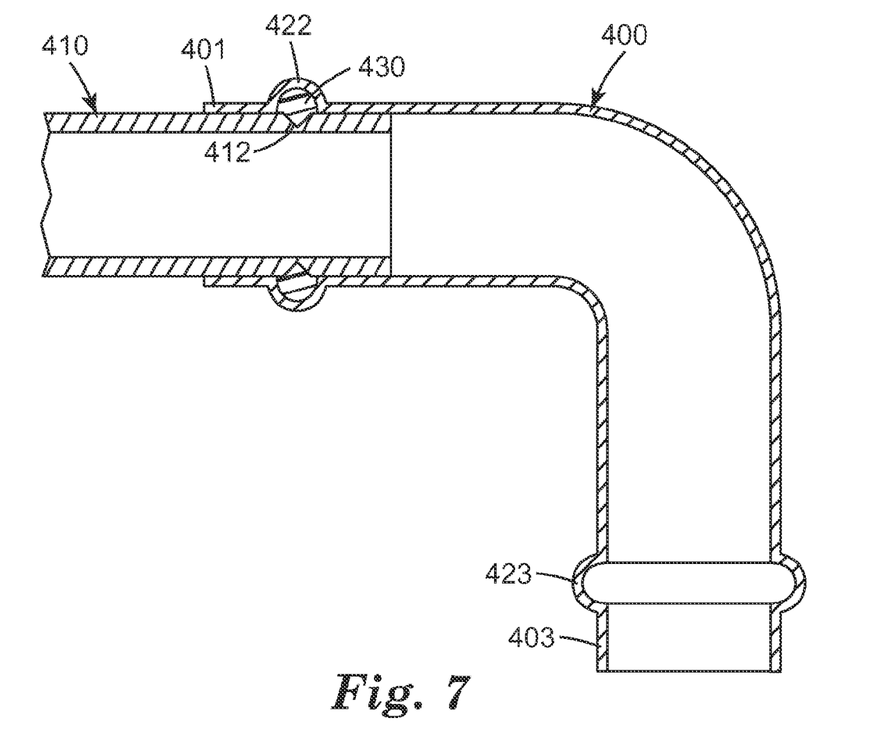
FIG. 7 illustrates the cross-section of a pipe joined to a 90° elbow using a key according to some embodiments of the present disclosure.

Although the embodiments above referred to the joining of two pipes, the methods, materials, and concepts apply equally to other pipe sections. For example, in some embodiments, one of the pipe sections may be a fitting or coupling, e.g., an elbow (e.g., a 45° or 90° elbow), a T-connection, a Y-connection, a cross, a cap, a reducer, an expander, and the like. For example, referring to FIG. 7, 90° elbow 400 is connected to first pipe 410. First keyway 412 is concave relative to the outer surface of first pipe 410. First pipe 410 is inserted in first end 401 of 90° elbow 400. First keyway 412 is aligned with second keyway 422, which is concave relative to the inner surface of first end 401 of elbow 400. First key 430 is positioned in the cavity created between the first keyway 412 and second keyway 422. When activated, the shape memory polymer will expand in cross section, substantially filling first keyway 412 and second keyway 422, bonding first pipe 410 to first end 401 of elbow 400 with a mechanical interference bond. Similarly, a second pipe section could be joined to second end 403 of 90° elbow 400. That is, a second pipe section could be inserted into second end 403 such that a keyway in the second pipe section would be aligned with third keyway 423 of elbow 400. A shape memory polymer key could then be used to form a mechanical interference bond between elbow 400 and the second pipe. Also, although not shown, one or both ends of the elbow may include a seal, e.g., an O-ring.

Figure 8:
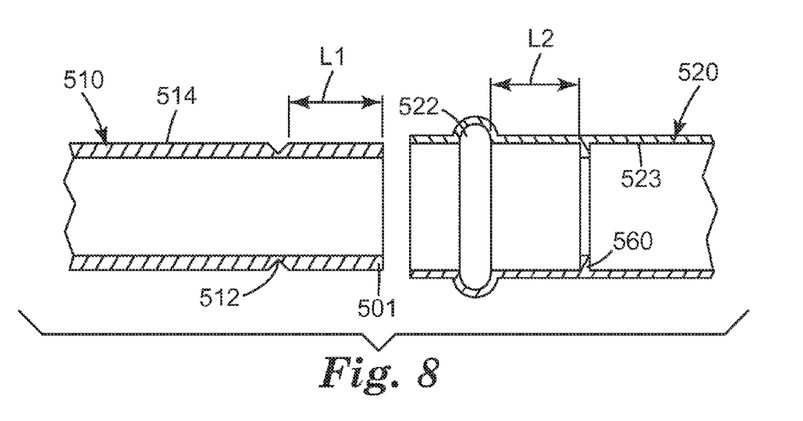
FIG. 8 illustrates a cross-section of first and second pipe sections having keyways and a stop, according to some embodiments of the present disclosure.
Figure 9:
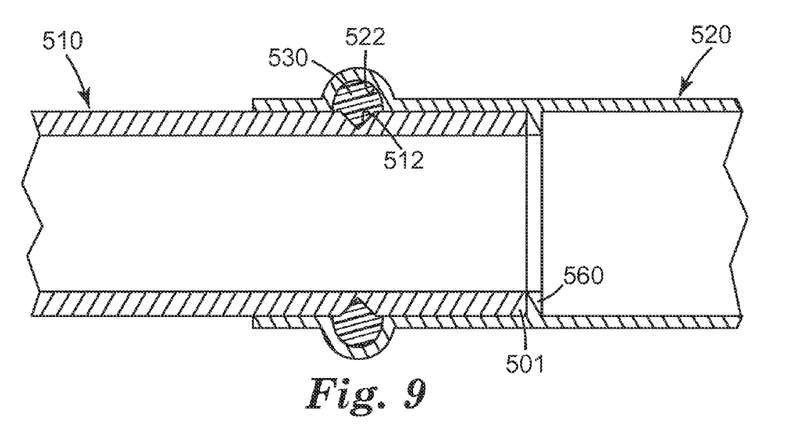
FIG. 9 illustrates a cross-section of the first pipe section of FIG. 8 inserted into the second pipe section of FIG. 8, including a key.

In some embodiments, alignment of the keyways in first and second pipe sections can be simplified through the use of a stop. Referring to FIGS. 8 and 9, first pipe 510 includes first keyway 512, which is concave relative to outer surface 514 and located a distance, L1, from first end 501 of first pipe 510.

Coupler 520 includes second keyway 522, which is concave relative to inner surface 523 of coupler 520. Coupler 520 also includes stop 560 projecting from inner surface 523 toward the center of coupler 520. Stop 560 is located a distance, L2, from second keyway 522. In some embodiments, the stop may be a circumferential ring. In some embodiments, the stop may comprise one or more discrete elements, e.g., posts.

Referring to FIG. 9, first pipe 510 is inserted into coupler 520. Distances L1 and L2 may be selected such that when first end 501 of first pipe 510 contacts stop 560, first pipe 510 can not be inserted further into coupler 520 and first keyway 512 and second keyway 522 are substantially aligned. Upon activation, key 530 substantially fills both keyways and forms a mechanical interference bond between the first pipe and the coupler. Although the embodiment of FIGS. 8 and 9 refer to a pipe and a coupler, any two pipe sections may be used. In addition, other features of the various embodiments may be included such as e.g., seals (e.g., O-rings).

The use of stops can also simplify the process of forming pipe assemblies. For example, if the distance between the stop and the second keyway is known (e.g., standardized or measured), a pipefitter can quickly and easily locate where on the first pipe section a corresponding first keyway should be formed. Common tools such as pipe cutters can then be used to form the first keyway at the appropriate location on site.

In some embodiments, the keys of the present disclosure provide a quick, convenient method for joining pipe sections. In some embodiments, the method is reversible. Generally, the first pipe section comprises a first keyway that is concave relative to the outer surface of the first pipe section, while the second pipe section comprises a second keyway that is concave relative to the inner surface of the second pipe section. These keyways may be formed by any known means, including, e.g., casting and molding (i.e., the keyway is formed as the original pipe section is cast or molded), or machining (e.g., the keyway is ground or carved into the pipe section after it is formed).

Generally, the shape and dimensions of the keyways are not particularly limited. In some embodiments, particularly when the keyway is formed after the pipe wall dimensions are fixed, the maximum depth of the keyway will be controlled by the wall thickness of the pipe, and the minimum acceptable remaining thickness of the pipe in the keyway region. In some embodiments, the dimensions of the keyways may be selected, together with both the temporary (i.e., reversibly deformed) dimensions and the permanent (i.e., undeformed) dimensions of the key, to provide the desired joint strength.

In some embodiments, a keyway may be concave with respect to one surface of a pipe and convex with respect to the opposite surface. For example, referring to FIG. 1A, first keyway 112 is concave with respect to outer surface 114 of pipe 110, and convex with respect to the inner surface. That is, first keyway 112 projects in toward the center of pipe 110, partially obstructing the flow path through the pipe. (See also first recesses 212a, 212b, and 212c of FIG. 5A.) Similarly, second keyway 122 is concave with respect to inner surface 123 of pipe 120 and convex with respect to the opposite outer surface. That is, second keyway 122 projects out away from the center second pipe 120. (See also second recesses 222a, 222b, and 222c of FIG. 5A.)

In some embodiments, it may be desirable to have one or both keyways remain flush with their opposing surface. For example, as shown in FIG. 6a, first keyway 312 is concave with respect to the outer surface of first pipe 310, but does not project in toward the center of pipe 310. (See, also, first keyway 412 of FIG. 7 and first keyway 512 of FIG. 8.) Thus, in contrast to first keyway 112 of FIG. 1, the first key 312 of FIG. 6a does not obstruct the flow of fluid through first pipe 310. Although not illustrated, in some embodiments, the second keyway may also be formed such that it does not project from the outer surface of the second pipe section. However, because such a projection would not inhibit flow and the pipe thickness in the region of the keyway would be greater, it may be desirable to have the second keyway project from the outer surface of the second pipe section.

Generally, the first pipe section is inserted into the second pipe section and the first keyway and the second keyway are aligned. A key comprising a shape memory polymer is positioned between the first keyway and the second keyway. In some embodiments, the depth and width of the keyway in at least one of the first and second pipe sections is sufficient such that the key can be recessed within the keyway resulting in minimal or no protrusion of the key out of the keyway. Generally, any protrusion of the key out of the keyway can inhibit the insertion of the first pipe section into the second pipe section. Therefore, in some embodiments, the key is fully recessed with a keyway prior to the insertion of the first pipe section into the second pipe section.

Once the pipe sections are aligned as desired, the key can activated, by, e.g., heating the shape memory polymer above its transition temperature. Prior to activation, the pipe sections can be adjusted or even separated. Thus, in some embodiments, the methods of the present disclosure allow a pipeline to be "dry fit" together prior to forming any permanent connections between adjacent pipes, fittings, or couplings.

Upon activation, the key tends to return to its permanent, undeformed dimensions. That is, the length is reduced, and the cross-section perpendicular to the length expands such that the key at least partially fills the portion of both the first keyway and the second keyway corresponding to the reduced length of the key. The key is initially positioned within the keyway with minimal or no protrusion, but when heated, the cross sectional dimensions expand sufficiently to at least partially fill, and, in some embodiments, substantially fill, the depth of both keyways. In order to have sufficient expansion to fill the depth of both keyways, it is necessary in some embodiments to have large reduction in length, e.g., a reduction in length of at least 10%.

Generally, the methods of the present disclosure provide a mechanical joint between adjacent pipe section, e.g., two pipes, a pipe and coupling, or a pipe and a fitting. Thus, in some embodiments, the methods of the present disclosure further comprise cooling the key to form a mechanical inference bond between the first pipe section and the second pipe section.

In some embodiments, the joints formed are reversible. For example, in some embodiments, the key can be reheated above the transition temperature of the shape memory polymer. Then, the first pipe section can be repositioned relative to the second pipe section. Upon re-cooling the key, the mechanical interference bond between the first pipe section and the second pipe section can be reformed. Thus, pipe joints can be adjusted with minimal effort and rework unlike prior methods of pipe joining, e.g., adhesives and solder where cutting out an adhesive or solder joint and fitting in a new section to span the gap is often required.

In some embodiments, the methods and materials of the present disclosure also provide a convenient means to refit a pipe network. For example, in some embodiments, one can re-heat the key(s) holding a particular pipe section in place, and remove that pipe section. A new, identical or different pipe section can then be inserted, along with the appropriate keys. Then, upon activating the shape memory polymers of the new keys, the new pipe section can be held firmly in place by the resulting mechanical interference fit.

EXAMPLES

Example 1

To make a stock catalyst solution, an oven-dried 500 mL flask under nitrogen was charged with $WCl_6$ (2.00 g, 0.005 mol, Sigma-Aldrich, St. Louis, Mo.), and about 100 mL of toluene (anhydrous, Sigma-Aldrich, St. Louis, Mo.). This mixture was stirred for one hour while purging with nitrogen. Nonylphenol (1.1 g, 0.005 mol, Sigma-Aldrich) was added via syringe and the solution was stirred for four hours with a nitrogen purge. Using a syringe, 2,4-pentanedione (0.77 g, 0.008 mol, Acros Organics) was then added, and the solution was stirred for 17 hours with a nitrogen purge. Anhydrous dicyclopentadiene (250 mL, 1.84 mol, from TCI America and containing 4% ethylidene norbornene) was added. The flask was placed in a 60° C. oil bath and vacuum was pulled on the solution for 1.5 hours to remove the toluene and other volatiles including some dicyclopentadiene. At that point, additional dicyclopentadiene was added to bring the total weight of the solution back up to 250 g, and an additional charge of 2,4-pentanedione (0.77 g, 0.008 mol, Acros Organics) was added.

This stock catalyst solution was used as follows to make Reactive Mixture A. An oven-dried 125 mL Erlenmeyer flask was capped with a septum and purged with nitrogen. Using a syringe, 5-ethylidene-2-norbornene (9.1 mL, Acros Organics), ethyl trichloroacetate (0.08 mL, Aldrich Chemical) and 2.8 mL of the stock catalyst solution described above were added.

Reactive Mixture B was prepared as follows. IRGANOX 1010 phenolic antioxidant (0.22 g, Ciba Specialty Chemical Corp, Tarrytown, N.Y.) was placed in an oven-dried 125 mL Erlenmeyer flask which was then capped with a septum and purged with nitrogen. Ethylidene norbornene (8.3 mL) and SANTICIZER 261a phthalate plasticizer (2.4 mL Ferro Corp.) were added, and the mixture was stirred until the IRGANOX 1010 dissolved. Then, 1.0 mL of a 10 vol % solution of diethylaluminumchloride (Sigma-Aldrich, St. Louis, Mo.) in dicyclopentadiene was added.

Reactive Mixtures A and B were combined to form a shape memory polymer in the form of an arc. Reactive Mixture A (11 mL) was loaded into a syringe. A separate syringe was loaded with Reactive Mixture B (11 mL). The syringes were loaded into a syringe pump and connected to a static mixer. Over the course of less than 30 seconds, the two solutions were injected into a flexible plastic tube with an inside diameter of 4.8 mm (0.19 in.). The sample exothermed as it cured, and the resulting shape memory polymer was then removed from the tube.

The polymer rod was then cut into 10.2 cm (4 in.) long sections. These sections were heated in a 120° C. oven and stretched by hand until the diameter decreased to 2.3 mm (0.09 in.), and upon cooling they retained this elongated shape. These rods were then wrapped into a three turn coil around a 2.4 cm (0.96 in) diameter copper pipe fitting, and the ends of the coil were clamped together. This coil was then heated in a 70° C. oven for 10 minutes. After cooling, the coil was removed from the pipe fitting, and retained its coil shape. This coil was then cut into an arc of about 270 degrees, and was sanded to decrease its thickness to 2.0 mm (0.08 in.) to form a key.

This key was then inserted into the keyway on the inside of a copper pipe coupler. The coupler had an inner bore of 22.4 mm (0.88 in.), and the keyway in the coupler was deep enough that the key did not obstruct the bore of the fitting when it was in the keyway. A piece of copper pipe with an outside diameter of 22.1 mm (0.87 in.) was scored with a tubing cutter around the entire circumference 6.4 mm (0.25 in.) from one end. A file was then used to widen this initial score into a keyway that was 0.30 mm (0.012 in.) deep and 1.8 mm (0.07 in.) wide. This pipe was then inserted into the coupler, and the keyway in the pipe rested adjacent to the keyway within the coupler with the key positioned between the keyways. This assembly was heated in a 150° C. oven for 5 minutes. After cooling, the pipe was firmly attached within the coupler, and the pipe could not be removed from the coupler by hand.

To detach the fitting, the pipe/coupler assembly was reheated in a 150° C. oven for 5 minutes. While still hot, the pipe was successfully pulled from the coupler by hand. The key was removed and found to be shorter with a thickness that had increased to 3.8 mm (0.15 in.).

Example 2

A piece of the 2.3 mm (0.09 in.) diameter elongated shape memory polymer rod described in Example 1 was wrapped in to a two-turn coil around a 1.6 cm (0.62 in.) outer diameter copper pipe, and the ends of the coil were clamped together. This coil was then heated gently with a heat gun until it visibly softened and tightened around the pipe. After cooling, the coil was removed from the pipe fitting and retained the coil shape. This coil was then cut into two keys of about 270 degrees each.

A "StreamTech 2" copper coupler (from Mueller Industries) with an inside diameter of 16.5 mm (0.65 in.) was modified by removing the two outer O-ring seals from their grooves, but leaving in place the two inner O-ring seals in their grooves. The shape memory polymer keys were then inserted into the two outermost grooves (i.e., keyways) in the coupler. The inside of the polymer keys was sanded to remove any polymer protruding into the bore of the fitting.

Two pieces of copper pipe with an outside diameter of 15.7 mm (0.62 in.) were scored with a tubing cutter around the entire circumference 23 mm (0.9 in.) from one end. A file was then used to widen these initial scores into keyways that were about 0.30 mm (0.012 in.) deep and 1.8 mm (0.07 in.) wide. The pipes were then inserted into each end of the copper coupler. The keyways in the pipes rested adjacent to the outer grooves (keyways) within the coupler with the key positioned between them. This assembly was heated with a heat gun for 45 seconds. After cooling, the pipes were firmly attached within the coupler, and could not be removed by hand.

The ends of the pipe assembly were each connected to a recirculating water bath and water was pumped through the copper pipe assembly. The temperature of the water was ramped from 25° C. to 80° C., and then maintained at 80° C. for 30 minutes. No water leaked from the pipe assembly.

Example 3

A 30.5 cm (12 inch) long rod of ABS (acrylonitrile-butadiene-styrene copolymer) with a 6 mm (0.25 inch) diameter (from Plastics International, Eden Prairie, Minn.) was heated in a 140° C. oven. The rod was then stretched by hand and allowed to cool resulting in an elongated rod with a diameter that was reduced to between 3 and 4 mm (0.12-0.16 inches). This elongated rod was wrapped into a two-turn coil around a 22.1 mm (0.87 in.) outer diameter copper pipe, and the ends of the coil were clamped together. This coil was then heated gently with a heat gun until it visibly softened and tightened around the pipe. After cooling, the coil was removed from the pipe fitting and retained the coil shape. This coil was then cut into an arc of about 270 degrees to form a key.

This ABS shape memory polymer key was inserted into the keyway of the pipe coupler used in Example 1. The inside of the polymer key was sanded to remove any polymer protruding out of the keyway and into the bore of the fitting. The pipe from Example 1 was inserted into the coupler such that the keyway on the pipe was aligned with the keyway in the coupler, and the ABS shape memory polymer key was positioned between the two keyways. This assembly was heated with a heat gun for 90 seconds. After cooling, the pipe was firmly attached within the coupler, and could not be removed by hand.

To detach the fitting, the pipe/coupler assembly was reheated with a heat gun for 60 seconds. While still hot, the pipe was successfully pulled from the coupler by hand. The shape memory polymer key was removed and found to be shorter by more than 30%.

Various modifications and alterations of this invention will become apparent to those skilled in the art without departing from the scope and spirit of this invention.

What is claimed is:

1. A method of joining a first pipe section comprising a first keyway that is concave relative to the outer surface of the first pipe section to a second pipe section comprising a second keyway that is concave relative to the inner surface of the second pipe section, the method comprising:
    inserting the first pipe section into the second pipe section;
    aligning the first keyway and the second keyway;
    positioning a first key comprising a first shape memory polymer having a first transition temperature between the first keyway and the second keyway, wherein the key has a length and a cross section perpendicular to the length;
    heating the first key above the first transition temperature; and
    reducing the length and expanding the cross section of the first key such that the first shape memory polymer fills a portion of both the first keyway and the second keyway, forming a mechanical inference bond between the first pipe section and the second pipe section,
    wherein the first or second keyway comprises a plurality of first recesses, the other keyway comprises a second recess, wherein aligning the first keyway and the second keyway comprises aligning two or more of the first recesses with at least a portion of the second recess to form a plurality of paired first and second recesses.

2. The method of claim 1, further comprising cooling the first shape memory polymer below the first transition temperature.

3. The method according to claim 1, wherein the second pipe section has a third keyway that is concave relative to the inside surface of the second pipe section, wherein the method further comprises
    inserting a third pipe section comprising a fourth keyway that is concave relative to the outside surface of the third pipe section into the second pipe section;
    aligning the third keyway and the fourth keyway;
    positioning a second key comprising a second shape memory polymer having a second transition temperature between the third keyway and the fourth keyway;
    heating the second key above the second transition temperature; and reducing the length and expanding the cross section of the second key such that the second shape memory polymer substantially fills a portion of both the third keyway and the fourth keyway.

4. The method according to claim 1, wherein the first key is recessed within the first keyway of the first pipe section before the first pipe section is inserted into the second pipe section.

5. The method according to claim 1, wherein the first key is recessed within the second keyway of the second pipe section before the first pipe section is inserted into the second pipe section.

6. The method according to claim 1, wherein the first keyway comprises a first circumferential groove, the second keyway comprises a second circumferential groove, and the first key comprises an arc.

7. The method according to claim 1, wherein the first keyway comprises a plurality of first recesses, the second keyway comprises a plurality of second recesses, and the first key comprises a plurality of segments, each segment comprising a shape memory polymer, wherein aligning the first keyway and the second keyway comprises aligning at least a portion of the first recesses with at least a portion of the second recesses to form a plurality of paired first and second recesses, and wherein positioning the first key comprising the first shape memory polymer having the first transition temperature between the first keyway and the second keyway comprises positioning at least one segment between two or more paired first and second recesses.

8. The method of claim 1, wherein the first key comprises a plurality of segments, each segment comprising a shape memory polymer, and wherein positioning the first key comprising the first shape memory polymer having the first transition temperature between the first keyway and the second keyway comprises positioning at least one segment between two or more paired first and second recesses.

9. The method according to claim 1, wherein heating the first key above the first transition temperature comprises directing a hot gas at the second pipe section.

10. The method according to claim 1, wherein the second pipe section further comprises a stop projecting from the inner surface of the second pipe section, and wherein inserting the first pipe section into the second pipe section comprises inserting the first pipe section until the first pipe section contacts the stop.

11. The method according to claim 1, further comprising reheating the first key above the first transition temperature of the first shape memory polymer, repositioning the first pipe section relative to the second pipe section, and reforming the mechanical interference bond between the first pipe section and the second pipe section.

12. The method according to claim 1, further comprising re-heating the first key above the first transition temperature of the first shape memory polymer, and removing the first pipe section from the second pipe section.

13. A joined pipe assembly made according to the method of claim 1.

14. A joined pipe assembly comprising
a first pipe section comprising a first keyway that is concave relative to the outside surface of the first pipe section;
a second pipe section comprising a second keyway that is concave relative to the inside surface of the second pipe section; and
a first key comprising a first shape memory polymer;
wherein at least a portion of the first pipe section is positioned inside the second pipe section such that the first keyway is aligned with the second keyway, and the first key is located between and at least partially fills the first keyway and the second keyway,
and further wherein the first or second keyway comprises a plurality of first recesses, the other keyway comprises a second recess, wherein the first keyway and the second keyway are aligned such that two or more of the first recesses are aligned with the second recess to form a plurality of paired first and second recesses, and wherein the shape memory polymer is located between and at least partially fills the paired first and second recesses.

15. The joined pipe assembly of claim 14, wherein the first key substantially fills a portion of both the first keyway and the second keyway corresponding to the length of the first key.

16. The joined pipe assembly according to claim 14, wherein the second pipe section further comprises a third keyway that is concave relative the inside surface of the second pipe section, and wherein the pipe assembly further comprises a third pipe section comprising a fourth keyway that that is concave relative to the outside surface of the third pipe section and a second key comprising a second shape memory polymer, wherein at least a portion of the third pipe section is positioned inside the second pipe section such that the third keyway is aligned with the fourth keyway, and the second key is located between and at least partially fills the first keyway and the second keyway.

17. The joined pipe assembly of claim 16, wherein the second key substantially fills the portion of both the third circumferential keyway and the fourth keyway corresponding to the length of the second key.

18. The joined pipe assembly according to claim 14, wherein the first keyway comprises a first circumferential groove, the second keyway comprises a second circumferential groove, and the first key comprises an arc.

19. The joined pipe assembly according to claim 14, wherein at least one of the first and second keyways has an arcuate cross-section.

20. The joined pipe assembly according to claim 14, wherein at least one of the first and second keyways has cross section selected from the group consisting of a triangle, a rectangle, and a trapezoid.

21. The joined pipe assembly according to claim 14, wherein the first keyway comprises a plurality of first recesses, the second keyway comprises a plurality of second recesses, and the first key comprises a plurality of segments, each segment comprising a shape memory polymer, wherein the first keyway and the second keyway are aligned such that at least a portion of the first recesses are aligned with at least a portion of the second recesses to form a plurality of paired first and second recesses, and wherein the segments comprising the shape memory polymer are located between and at least partially fill the paired first and second recesses.

22. The joined pipe assembly according to claim 14, wherein the first or second keyway comprises a plurality of first recesses, the other keyway comprises a second recess, and the first key comprises a plurality of segments, each segment comprising a shape memory polymer, wherein the first keyway and the second keyway are aligned such that two or more of the first recesses are aligned with the second recess to form a plurality of paired first and second recesses, and wherein the segments comprising the shape memory polymer are located between and at least partially fill the paired first and second recesses.

23. The joined pipe assembly according to claim 14, wherein the first pipe section is in contact with a stop projecting from the inner surface of the second pipe section.

\* \* \* \* \*